US010697114B2

(12) United States Patent
Ono et al.

(10) Patent No.: US 10,697,114 B2
(45) Date of Patent: *Jun. 30, 2020

(54) FIBER-REINFORCED RESIN INTERMEDIATE MATERIAL AND METHOD FOR MANUFACTURING SAME

(71) Applicant: THE JAPAN STEEL WORKS, LTD., Tokyo (JP)

(72) Inventors: Akio Ono, Hiroshima (JP); Akira Yasue, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,532

(22) Filed: Jun. 4, 2019

(65) Prior Publication Data

US 2019/0284755 A1  Sep. 19, 2019

Related U.S. Application Data

(63) Continuation of application No. 15/519,237, filed as application No. PCT/JP2015/079297 on Oct. 16, 2015, now Pat. No. 10,351,994.

(30) Foreign Application Priority Data

Oct. 17, 2014  (JP) .................................. 2014-213114

(51) Int. Cl.
*D06N 3/00* (2006.01)
*B29C 70/50* (2006.01)
(Continued)

(52) U.S. Cl.
CPC ......... *D06N 3/0084* (2013.01); *B29B 15/105* (2013.01); *B29C 70/30* (2013.01);
(Continued)

(58) Field of Classification Search
CPC ..... B29B 15/105; B29B 15/12; B29B 15/122; B29C 70/30; B29C 70/506; B29C 70/50;
(Continued)

(56) References Cited

U.S. PATENT DOCUMENTS

| 5,094,883 A | 3/1992 | Muzzy et al. |
| 5,639,307 A | 6/1997 | Bellemare |

(Continued)

FOREIGN PATENT DOCUMENTS

| CN | 104105589 A | 10/2014 |
| JP | 2003-165851 A | 6/2003 |

(Continued)

OTHER PUBLICATIONS

International Search Report dated Jan. 19, 2016 issued by International Searching Authority in counterpart International Application No. PCT/JP2015/079297 (PCT/ISA/210).

(Continued)

*Primary Examiner* — Camie S Thompson
(74) *Attorney, Agent, or Firm* — Sughrue Mion, PLLC

(57) ABSTRACT

The present invention provides a fiber-reinforced resin intermediate material, including not only a thermoplastic resin but also a thermosetting resin, in which defects such as voids are difficult to be generated and which is excellent in shaping ability; and a method for manufacturing the same. The fiber-reinforced resin intermediate material according to the present invention is a fiber-reinforced resin intermediate material formed by attaching a resin to an outer surface part of a reinforcing fiber substrate formed of reinforcing fibers subjected to opening and heating the resin to a temperature equal to or higher than the melting point of the resin to impregnate the reinforcing fiber substrate with the resin, (Continued)

wherein the reinforcing fiber substrate has void space that is opened on an outer surface thereof and the resin is in a semi-impregnated state.

7 Claims, 4 Drawing Sheets

(51) Int. Cl.

| | |
|---|---|
| *B29B 15/10* | (2006.01) |
| *B29C 70/30* | (2006.01) |
| *D03D 25/00* | (2006.01) |
| *D06N 3/12* | (2006.01) |
| *B29K 77/00* | (2006.01) |
| *B29K 307/04* | (2006.01) |

(52) U.S. Cl.
CPC ............ *B29C 70/50* (2013.01); *B29C 70/506* (2013.01); *D03D 25/00* (2013.01); *D06N 3/0015* (2013.01); *D06N 3/125* (2013.01); *B29K 2077/00* (2013.01); *B29K 2307/04* (2013.01); *B29K 2313/02* (2013.01); *B29K 2995/0063* (2013.01); *D06N 2201/087* (2013.01); *D06N 2203/065* (2013.01)

(58) Field of Classification Search
CPC .............. B29C 70/547; B29K 2307/04; B29K 2077/00; B29K 2313/02; B29K 2995/0063; D06N 3/0015; D06N 3/0084; D06N 3/125; D06N 3/12; D06N 3/0093; D06N 2201/087; D06N 2203/065; D03D 25/00; D06M 23/00; B32B 2260/046; B32B 2305/076; B32B 5/10; Y10T 156/10; Y10T 428/249921; Y10T 442/10; Y10T 442/20; Y10T 442/2992; B23K 2101/16; D07B 7/145; Y10S 118/05; C04B 41/4584; C08J 5/042; C08J 5/24
USPC .................. 442/1, 59; 428/292.1, 221, 375; 156/181, 60, 283; 427/185, 459, 174, 427/461, 600, 385.5, 180
See application file for complete search history.

(56) References Cited

U.S. PATENT DOCUMENTS

| | | |
|---|---|---|
| 5,756,206 A | 5/1998 | Davies et al. |
| 10,351,994 B2* | 7/2019 | Ono ..................... B29B 15/105 |
| 2002/0197397 A1 | 12/2002 | Staheli |
| 2003/0181114 A1 | 9/2003 | Newton et al. |
| 2012/0003891 A1 | 1/2012 | Schmidt et al. |
| 2014/0014762 A1 | 1/2014 | Ichinomiya et al. |
| 2014/0065911 A1 | 3/2014 | Schmidt et al. |
| 2014/0147620 A1 | 5/2014 | Li et al. |
| 2015/0017853 A1 | 1/2015 | Perillat-Collomb et al. |

FOREIGN PATENT DOCUMENTS

| | | |
|---|---|---|
| JP | 2008-207544 A | 9/2008 |
| JP | 2013-180406 A | 9/2013 |
| JP | 2014-19141 A | 2/2014 |
| JP | 2014-172336 A | 9/2014 |
| WO | 2010/108701 A1 | 9/2010 |

OTHER PUBLICATIONS

Communication dated Jun. 27, 2018, issued by the European Patent Office in counterpart European Patent Application No. 16849984.8.
Office Action dated Aug. 21, 2018 by the State Intellectual Property Office of P.R. China in counterpart Chinese Patent Application No. 201580056265.6.
Written Opinion dated Jan. 19, 2016 issued by International Searchng Authority in counterpart International Applicaiton No. PCT/JP2015/079297 (PCT/ISA/237).
U.S. Appl. No. 15/519,237, Akio Ono, et al., filed Apr. 14, 2017.
Communication dated Feb. 27, 2020, issued by the Brazilian Patent Office in counterpart Brazilian Application No. BR112017007894-5.

* cited by examiner

[FIG.1]
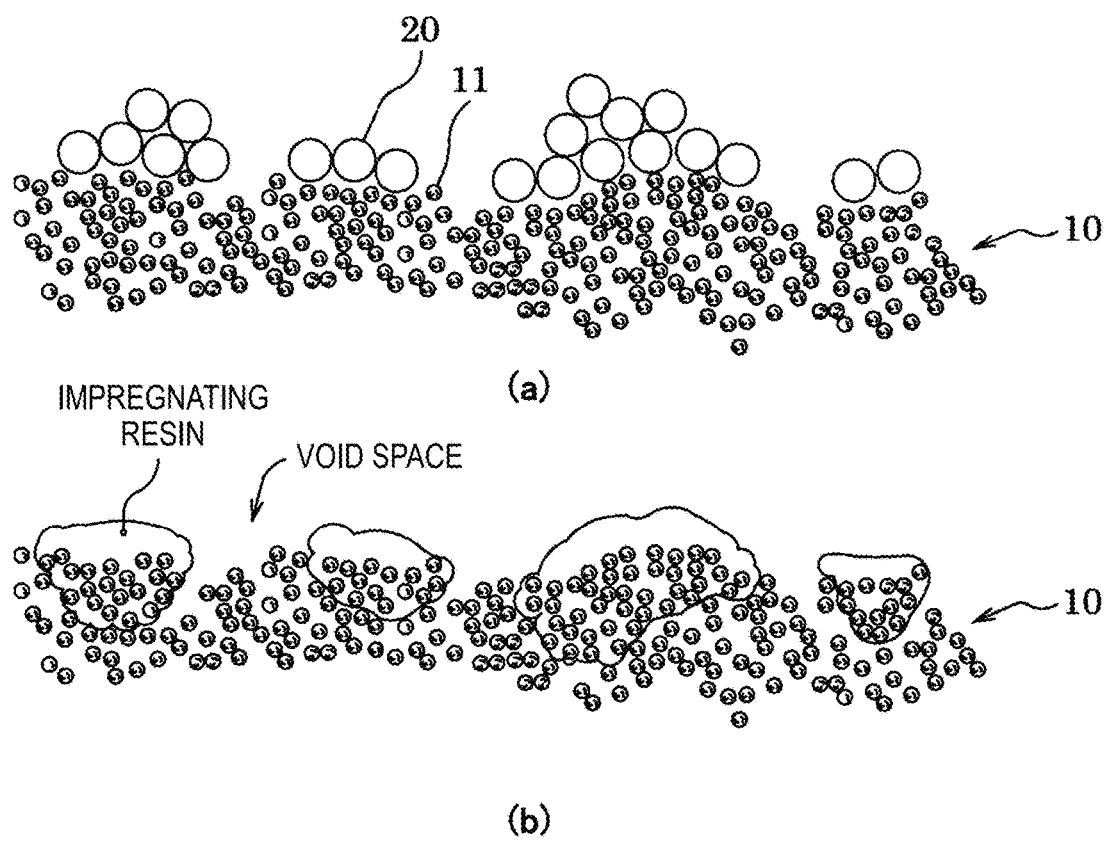

[FIG.2]
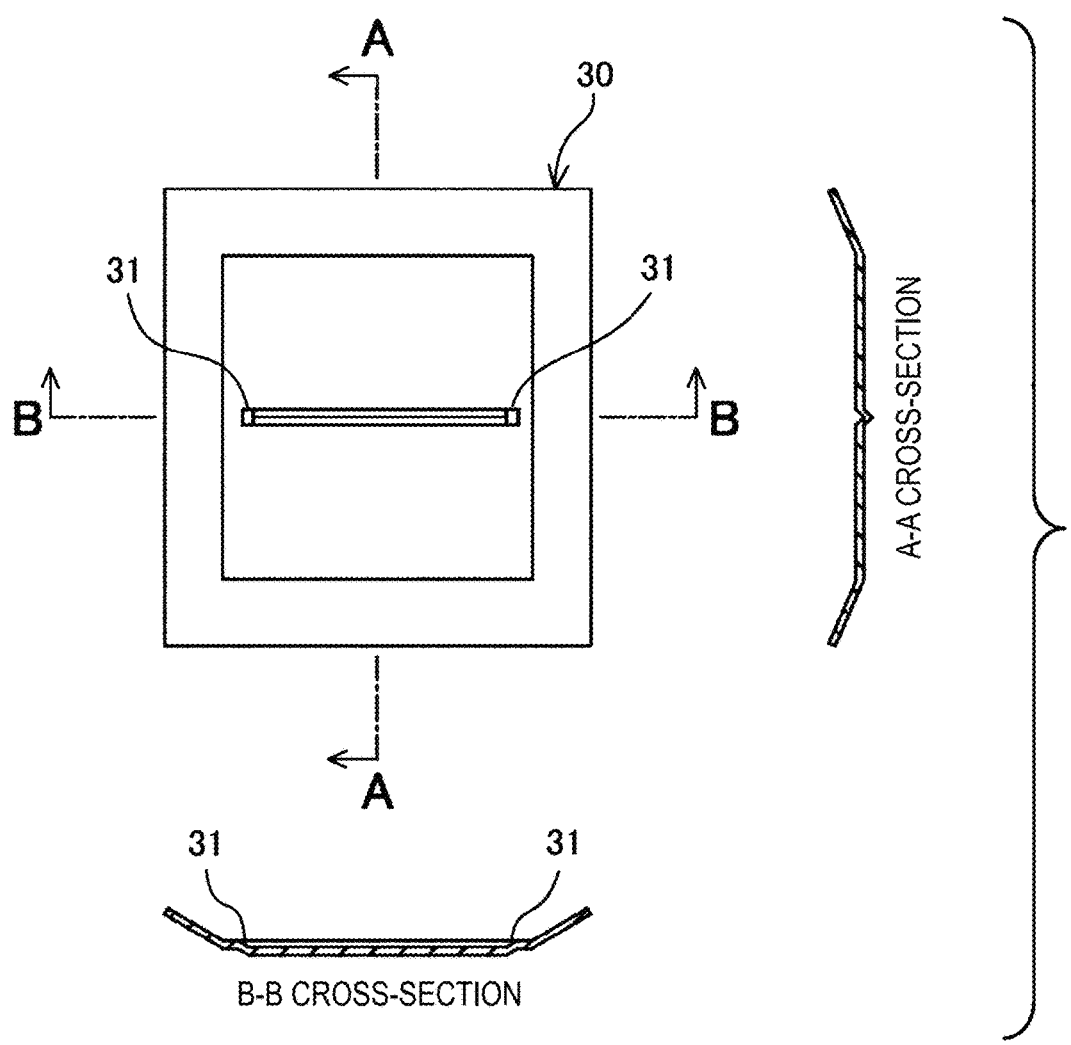

[FIG.3]
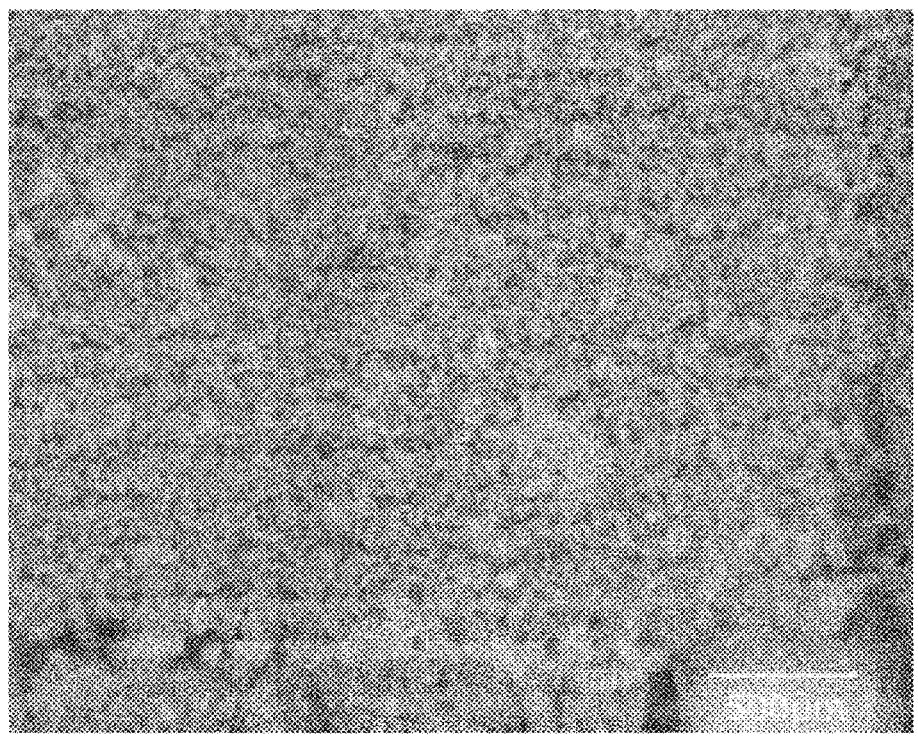
[FIG.4]
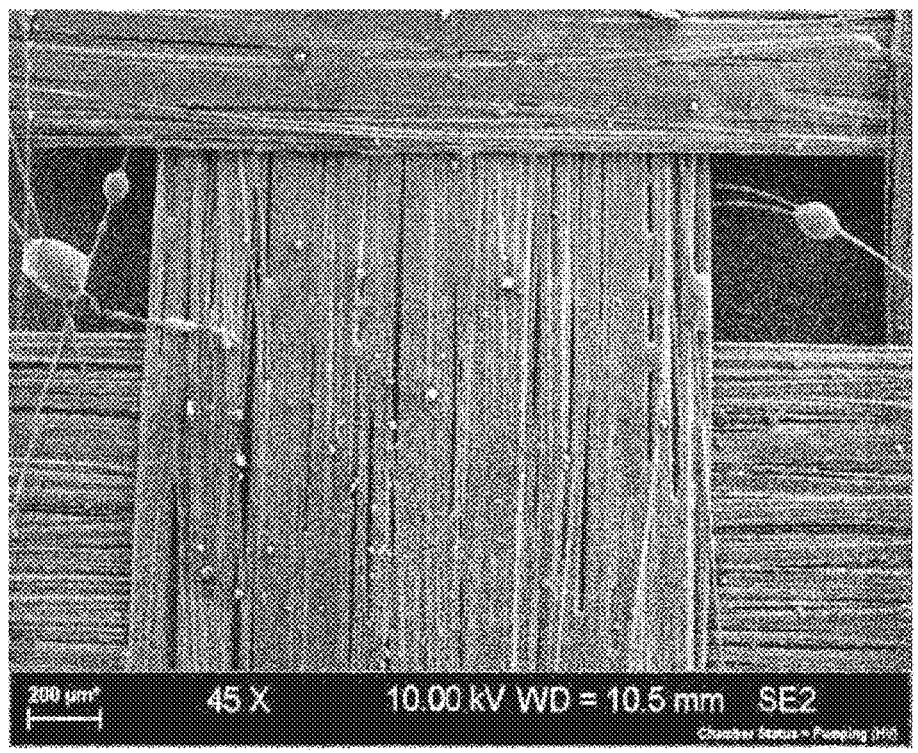

[FIG.5]
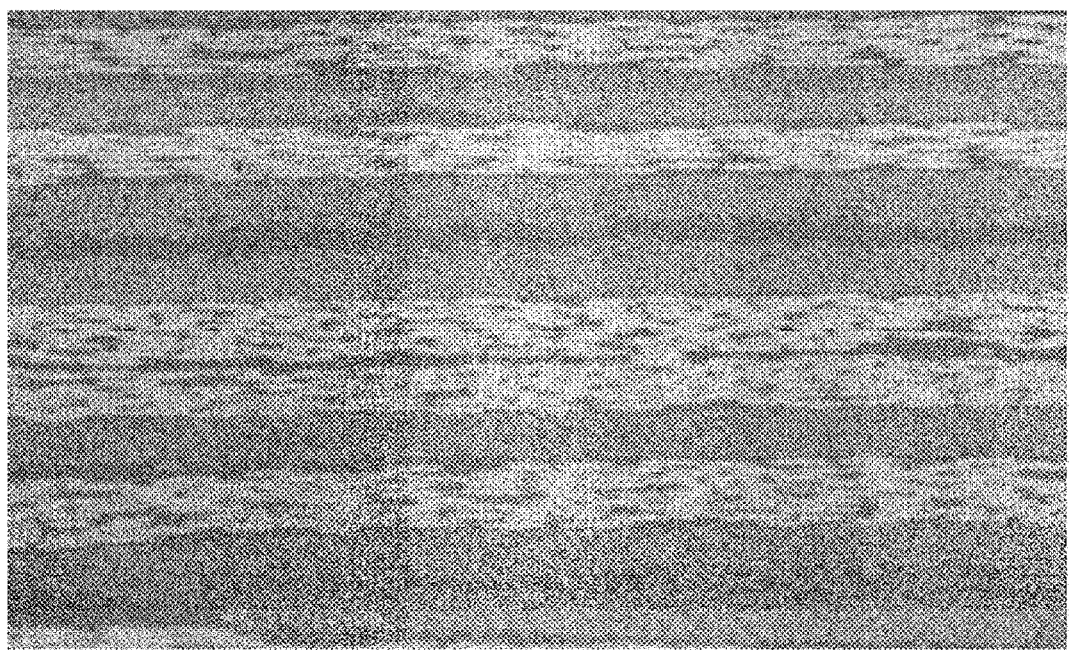

FIBER-REINFORCED RESIN INTERMEDIATE MATERIAL AND METHOD FOR MANUFACTURING SAME

CROSS REFERENCE TO RELATED APPLICATIONS

This application is a Continuation of U.S. application Ser. No. 15/519,237 filed Apr. 14, 2017, which is a National Stage of International Application No. PCT/JP2015/079297 filed Oct. 16, 2015, which claims priority from Japanese Patent Application No. 2014-213114, filed Oct. 17, 2014, the contents of which are incorporated herein by reference in its entirety.

TECHNICAL FIELD

The present invention relates to a fiber-reinforced resin intermediate material to be used under heating and pressurization in a laminated state and a method for manufacturing the same.

BACKGROUND ART

In recent years, for the purpose of weight saving and an improvement in mechanical strength, composite fiber-reinforced resins obtained by impregnating reinforcing fiber substrates such as carbon fiber and glass fiber with a resin have been widely utilized in a variety of fields and uses and their application to aircraft components and automobile components have been in progress. Such fiber-reinforced resin molded articles are required to have less defects such as voids, the impregnation of the reinforcing fiber substrate with the resin being performed at a predetermined fiber volume content, so as to exhibit predetermined properties such as mechanical strength. Also, it is required to have such shaping ability that molding is possible even if the shape is complex one. For such requirement, there have been proposed a variety of fiber-reinforced resin intermediate materials wherein a reinforcing fiber substrate is impregnated with a resin and which is used under heating and pressurization in a laminated state.

PTL 1 proposes a fiber-reinforced thermoplastic resin sheet wherein, although a thermoplastic resin has high melt viscosity and uniform impregnation of a reinforcing fiber bundle therewith is difficult to perform, a thermoplastic resin non-woven fabric is melted to impregnate the reinforcing fiber bundle with the thermoplastic resin by overlaying the thermoplastic resin non-woven fabric on a reinforcing fiber sheet in which a plurality of the reinforcing fiber bundles are aligned in one direction and performing pressurization while heating. It is said that the fiber-reinforced thermoplastic resin sheet can be made such a semi-impregnated state that void space parts at which the reinforcing fiber bundle is not impregnated with the thermoplastic resin are present. Therefore, it is said that a time required for manufacturing the fiber-reinforced thermoplastic resin sheet can be shortened, a fiber-reinforced thermoplastic resin sheet having flexibility is obtained, non-impregnated parts can be reduced since the reinforcing fiber sheet can be thinned, and thus it is possible to perform sufficient impregnation when the pressurization while heating is performed at the time of processing into a final molded article.

PTL 2 proposes a prepreg which comprises a fiber substrate formed in a layered shape and a resin layer provided on at least one surface side of the fiber substrate and composed of a resin composition and wherein a void space layer not impregnated with the resin composition is formed in at least a part of the fiber substrate. It is said that the void space layer of the prepreg may have a form that a part of the fiber substrate is exposed and is preferably formed so as to communicate from one end of the prepreg to another end thereof. Moreover, it is said to be sufficient that a void space layer communicating from one end to the other end is present at an intermediate part thereof even when resin layers are present on both surfaces of the fiber substrate. In the case of laminating such a prepreg, since the resin is supported with the fiber substrate, it is said that the fiber substrate can be prevented from waving and air is easily released at the time of laminating the prepreg and air bubbles are less prone to occur. As the above resin composition, a thermosetting resins such as a phenol novolak resin and a cresol novolak resin are mentioned and a thermoplastic resin such as a phenoxy resin or a polyimide resin may be used in combination.

PTL 3 proposes a notched prepreg substrate having reinforcing fibers aligned in one direction, wherein a plurality of rows composed of intermittent notches in a direction crossing the reinforcing fibers are provided on the whole surface of the prepreg substrate, projection length of the notches projected to a perpendicular direction of the reinforcing fibers is 30 μm to 10 mm, all of the reinforcing fibers are substantially cut by the notches, fiber length of the reinforcing fiber cut by the notches is 10 to 100 mm, and fiber volume content falls within the range of 45 to 65%. It is said that the notched prepreg substrate has good flowability, has molding followability, is excellent in shaping ability, and can provides a prepreg substrate that is an intermediate substrate for fiber-reinforced plastics suitably used in automobile components, sporting goods, and the like.

CITATION LIST

Patent Literature

PTL 1: JP-A-2003-165851
PTL 2: JP-A-2013-180406
PTL 3: JP-A-2008-207544

SUMMARY OF INVENTION

Technical Problem

As mentioned above, shaping ability is required for a fiber-reinforced resin intermediate material. In PTLs 1 to 3, it is intended to improve the shaping ability of the fiber-reinforced resin intermediate materials by making a fiber-reinforced thermoplastic resin sheet a semi-impregnated state, providing a void space layer not impregnated in a prepreg, or providing notches on a notched prepreg substrate. In view of requiring no additional step, the fiber-reinforced thermoplastic resin sheet described in PTL 1 and the prepreg described in PTL 2 are more preferable than the notched prepreg substrate described in PTL 3.

On the other hand, in view of easiness of the generation of defects such as voids, the fiber-reinforced thermoplastic resin sheet described in PTL 1 has a problem of easy formation of voids. That is, the fiber-reinforced thermoplastic resin sheet is molded by pressurizing a fabric composed of a thermoplastic resin fiber overlaid on a fiber-reinforced sheet while heating. Therefore, in the fiber-reinforced thermoplastic resin sheet, since the melted thermoplastic resin layer covers a surface of the pressurized and compressed reinforcing fiber sheet in a film shape, there are problems that the thermoplastic resin is less prone to be impregnated, air in the reinforcing fiber sheet is difficult to be released, and thus voids are easily formed.

The prepreg described in PTL 2 is a prepreg wherein a fiber substrate is impregnated with a resin composition based on a thermosetting resin and thus it is unclear whether a resin composition composed of only a thermoplastic resin having a high viscosity as compared with a thermosetting resin is similarly applicable or not. Moreover, the prepreg has a resin layer formed on the whole upper surface of the fiber substrate and has a void space layer formed so as to communicate from one end to another end under the resin layer. Furthermore, the resin layer is a resin layer formed by a roll-to-roll process or a resin layer formed by feeding a liquid resin composition such as a varnish of a resin composition and curing it on the fiber substrate. Therefore, since migration distance of air becomes long and thus the air is difficult to be released, the prepreg described in PTL 2 has a problem that air in the prepreg can not always sufficiently discharged.

According to Examples, the notched prepreg substrate described in PTL 3 is prepared as follows. That is, it is described that an epoxy resin composition is applied on a release paper subjected to a silicone coating treatment and having a thickness of 100 μm, using a reverse roll coater to prepare a resin film and then the resin film is overlaid on both surfaces of carbon fibers arranged in one direction, and impregnation with the resin is achieved by heating and pressurization to prepare the prepreg substrate. It has a problem that voids are easily formed similarly to the fiber-reinforced thermoplastic resin sheet described in PTL 1.

In consideration of such conventional problems, an object of the present invention is to provide a fiber-reinforced resin intermediate material, including not only a thermoplastic resin but also a thermosetting resin, in which defects such as voids are difficult to generate and which is excellent in shaping ability; and a method for manufacturing the same.

Solution to Problem

A fiber-reinforced resin intermediate material according to the present invention is formed by attaching a resin to an outer surface part of a reinforcing fiber substrate, which is formed of reinforcing fibers subjected to opening, and heating the resin to a temperature equal to or higher than the melting point of the resin to impregnate the reinforcing fiber substrate with the resin, wherein the reinforcing fiber substrate has void space that is opened on an outer surface thereof and the resin is in a semi-impregnated state.

In the above invention, the resin to be attached to the reinforcing fiber substrate may be a powder. Further, the reinforcing fiber may be carbon fiber, and basis weight of the reinforcing fiber substrate may be 40 to 250 g/m².

In the fiber-reinforced resin intermediate material according to the present invention, apparent density ρ may be ½ to 1/50 of target apparent density ρc. Here, the target apparent density ρc is $\rho c = Vr \times \rho r + Vf \times \rho f$ when fiber volume content of the reinforcing fiber is Vf and density thereof is ρf and resin volume content of the resin is Vr and density thereof is ρr.

A fiber-reinforced resin molded body (molded article) having a complex shape and less defects can be molded by laminating the fiber-reinforced resin intermediate material and performing heating and pressurization.

Moreover, the fiber-reinforced resin intermediate material whose reinforcing fiber substrate is impregnated with a resin in a semi-impregnated state and has void space opened on an outer surface thereof can be manufactured by the following method. That is, the fiber-reinforced resin intermediate material of the invention can be suitably manufactured by electrostatically attaching a resin powder having a predetermined average grain size to the reinforcing fiber substrate so that fiber volume content of the fiber-reinforced resin intermediate material becomes a predetermined value based on the outer diameter of a reinforcing fiber that forms the reinforcing fiber substrate and the bulk density of the reinforcing fiber substrate.

Advantageous Effects of Invention

The fiber-reinforced resin intermediate material according to the present invention is excellent in shaping ability and impregnating ability simultaneously. Therefore, by laminating the fiber-reinforced resin intermediate material and heating and pressurizing it, a fiber-reinforced resin molded body (molded article) having a desired fiber volume content, sufficiently impregnated, and having less defects such as voids can be manufactured even when it has a complex shape.

BRIEF DESCRIPTION OF DRAWINGS

FIG. 1(a) is a drawing schematically showing a reinforcing fiber substrate in which a resin powder is attached to a reinforcing fiber substrate and FIG. 1(b) is a drawing schematically showing a microstructure of a part of the reinforcing fiber substrate impregnated with the resin powder.

FIG. 2 is a drawing showing a molded shape of the fiber-reinforced resin molded article of Examples.

FIG. 3 is an optical microscope photograph of a surface of the reinforcing fiber substrate to which the resin powder of Examples is electrostatically attached.

FIG. 4 is a SEM photograph of a surface of the fiber-reinforced resin intermediate material of Examples.

FIG. 5 is an optical microscope photograph of a cross-section of the fiber-reinforced resin molded article of Examples.

DESCRIPTION OF EMBODIMENTS

The following will explain modes for carrying out the present invention based on drawings. The fiber-reinforced resin intermediate material according to the invention is a fiber-reinforced resin intermediate material formed by attaching a resin to an outer surface part of a reinforcing fiber substrate formed of reinforcing fibers subjected to opening and heating the resin to a temperature equal to or higher than the melting point of the resin to impregnate the reinforcing fiber substrate with the resin, wherein the reinforcing fiber substrate has void space that is opened on an outer surface thereof and the resin is in a semi-impregnated state. Since the fiber-reinforced resin intermediate material of the invention possesses an impregnated part where an outer surface part of the reinforcing fiber substrate is impregnated with a melted resin and a non-impregnated part where the melted resin is absent and has void space resulting from the non-impregnated part, the material can possess shaping ability and impregnation ability simultaneously. Incidentally, in the present Description, a phrase of "resin is in a semi-impregnated state" means a state that an impregnated part where an outer surface part of the reinforcing fiber substrate is impregnated with a melted resin and a non-impregnated part where the melted resin is absent are co-present and the phrase discriminates from a state that the outer surface part of the reinforcing fiber substrate is covered with the melted resin.

For preparing the fiber-reinforced resin intermediate material composed of such a reinforcing fiber substrate where a resin is in a semi-impregnated state, it is preferable to prepare the material by electrostatically attaching a resin powder to the reinforcing fiber substrate and heating it to achieve impregnation therewith. That is, a resin powder 20 is first electrostatically attached to a reinforcing fiber substrate 10. The resin powder 20 is attached to a surface of the reinforcing fiber substrate 10 in a uniform thickness and in a uniform distribution when macroscopically observed. However, when microscopically observed, as shown in FIG. 1(*a*), the surface of the reinforcing fiber substrate 10 formed from a large number of bundled reinforcing fibers 11 has a part to which the resin powder 20 is attached in one layer or in plural layers or a part to which the resin powder 20 is not attached. Such a state can be generated by electrostatically attaching the resin powder 20 having a predetermined average grain size to the reinforcing fiber substrate 10 so that fiber volume content of the reinforcing fiber substrate 10 becomes a predetermined value based on the outer diameter of the reinforcing fiber 11 that forms the reinforcing fiber substrate 10 and the bulk density of the reinforcing fiber substrate 10.

Next, the reinforcing fiber substrate 10 having the resin powder 20 attached thereto is heated to a temperature equal to or higher than the melting point of the resin powder 20. In the invention, pressurization of the reinforcing fiber substrate 10 having the resin powder 20 attached thereto is not performed. Therefore, as shown in FIG. 1(*b*), the resin powder 20 attached to the reinforcing fiber substrate 10 is melted on the surface of the reinforcing fiber substrate 10 in the heating operation but the distribution corresponding to the aforementioned microscopic attaching situation is maintained and a film-like melt layer that covers the whole surface of the reinforcing fiber substrate 10 is not formed. The melted resin decreases surface area thereof by surface tension thereof to form a non-impregnated part where the melted resin is absent on the surface of the reinforcing fiber substrate 10. Also, the melted resin penetrates into the void space part in the reinforcing fiber substrate 10 through a space between the reinforcing fibers 11. As for the temperature and time for melting/impregnation of the resin, most suitable conditions are selected according to the reinforcing fiber substrate 10 and the resin powder 20.

In the invention, when a reinforcing fiber is composed of a bundle of fibers, opening means making the fiber flat. By the opening, in the present fiber-reinforced resin intermediate material, the reinforcing fiber substrate is impregnated with a resin in a semi-impregnated state and it is facilitated to form a semi-impregnated state having void space opened on an outer surface of the reinforcing fiber substrate. The outer surface of the reinforcing fiber substrate means outside of the reinforcing fiber 11 that forms the surface of the reinforcing fiber substrate 10. The outer surface part of the reinforcing fiber substrate has a meaning including the surface of the reinforcing fiber substrate 10 and a part under the surface. Incidentally, in the invention, opening means that a bundle of dense fibers to be impregnated is made flat so as to have a predetermined thickness (e.g., 100 nm) or less and is applied to even one composed of short fibers such as chopped ones.

In the invention, the reinforcing fiber 11 is preferably carbon fiber and basis weight of the reinforcing fiber substrate 10 composed of the carbon fiber is suitably 40 to 250 g/m$^2$. By controlling the basis weight to 40 g/m$^2$ or more, the total amount of the reinforcing fiber per one sheet of the fiber-reinforced resin intermediate material to be obtained can be prevented from decreasing and the number of the sheets of the fiber-reinforced resin intermediate material necessary at molding to the fiber-reinforced resin molded article does not uselessly increase, so that the control is practical. By controlling the basis weight to 250 g/m$^2$ or less, it can be prevented to require a long period of time for the step in which the melted resin penetrates into the void space part in the reinforcing fiber substrate 10 through a space between the reinforcing fibers 11 at the time of heating, so that the control is practical. Incidentally, the reinforcing fiber 11 may be glass fiber or natural fiber and, even in a reinforcing fiber substrate 10 composed of such fiber, a basis weight range suitable for each one is determined.

As the resin powder 20, there can be used polycarbonate (PC), polysulfone (PSU), polyethersulfone (PES), polyamideimide (PAD, polyetherimide (PEI), polyamide-based resins (PA6, PA11, PA66), polybutylene terephthalate (PBT), polyethylene terephthalate (PET), polyphenylene sulfide (PPS), polyether ether ketone (PEEK), polyether ketone ketone (PEKK), and the like. Moreover, it may be a powder of a thermosetting resin such as a phenol resin or an epoxy resin without limiting to the powders of the thermoplastic resins as mentioned above.

In the invention, as the resin powder 20, a powder having an average grain size ½ to 30 times the outer diameter of the reinforcing fiber 11 can be used. The average grain size is appropriately selected according to density and viscosity of the resin to be used, outer shape of fiber, and final fiber volume content. The resin powder 20 having such an average grain size has an advantage that it is easy to attach it electrostatically to the reinforcing fiber substrate 10. Moreover, by using the resin powder 20 having an average grain size in the above range, the fiber volume content of the reinforcing fiber substrate 10 can be controlled to a predetermined value, specifically 15 to 70%.

As mentioned above, in the invention, the resin powder 20 is used for attaching a resin to the reinforcing fiber substrate and the resin powder 20 is attached to the reinforcing fiber substrate 10 by electrostatic attachment. Therefore, in the invention, the attachment of the resin powder 20 to the reinforcing fiber substrate 10 can be microscopically adjusted. The electrostatic attachment of the resin powder 20 can be performed by charging the resin powder 20 in a state of mixing with air and imparting further high voltage just before the attachment of the resin powder 20 to the reinforcing fiber substrate 10. Incidentally, the resin powder 20 is preferably one having a smaller average grain size from the viewpoint of impregnation but the one is disadvantageous in view of a high unit price thereof. On the other hand, for controlling an electrostatically attached state of the resin powder 20 to form the fiber-reinforced resin intermediate material having void space opened on the outer surface, the average grain size of the resin powder 20 is preferably larger.

As mentioned above, in order to prepare the fiber-reinforced resin intermediate material obtained by impregnating the reinforcing fiber substrate with a resin in a semi-impregnated state in such a degree that the reinforcing fiber substrate has void space opened on the outer surface, it is suitable to control apparent density ρ of the reinforcing fiber substrate to a predetermined range. That is, relative to density (target apparent density ρc) when the fiber-reinforced resin intermediate material composed of the reinforcing fiber substrate is constituted by the reinforcing fiber and the resin and no void space is present, the apparent density ρ of the reinforcing fiber substrate is suitably controlled to ½ to 1/50. Here, when the fiber volume content of the carbon fiber is Vf and density thereof is ρf and the resin volume content of the resin is Vr and density thereof is ρr, ρc=Vr×ρr+Vf×ρf. The case where the apparent density ρ is around ½ of the target apparent density ρc is preferable in a reinforcing fiber substrate composed of a woven fabric where opened warp yarns and weft yarns have been woven and the case where the apparent density ρ is around 1/50 of the target apparent density ρc is preferable in a mat-shaped reinforcing fiber substrate composed of chopped ones subjected to opening. Incidentally, the apparent density ρ is one obtained by dividing the mass of the reinforcing fiber substrate by apparent volume.

In the above, the fiber-reinforced resin intermediate material according to the invention is explained. The fiber-reinforced resin intermediate material is laminated in a predetermined mold and heated and pressurized, thereby being molded into a fiber-reinforced resin molded article having a predetermined shape. By using the fiber-reinforced resin intermediate material, it is possible to mold it into a fiber-reinforced resin molded article having a fiber volume content of 15 to 70% and a void ratio of 1.5% or less, further a void ratio of 0.5% or less.

EXAMPLES

By preparing a fiber-reinforced resin intermediate material in which a reinforcing fiber substrate composed of carbon fiber was impregnated with a polyamide (PA6) resin, laminating the material and performing heating and pressurization, a test of preparing a rectangular fiber-reinforced resin molded article 30 shown in FIG. 2 was carried out. As the reinforcing fiber substrate, there was used one obtained by opening a carbon fiber bundle (ten thousand fibers) having a diameter of 7 μm so as to have a width of 2 mm to prepare a plain-woven carbon fiber woven fabric having a basis weight of 63 g/m² and cutting therefrom. As the impregnating resin, a PA6 resin powder having an average grain size of 20 μm was used.

The PA6 resin powder was electrostatically attached to the carbon fiber substrate so as to be a fiber volume content of 60% and, after the attachment, the PA6 resin powder was promptly melted using an IR heater. The thickness of the prepared fiber-reinforced resin intermediate material was 180 μm. FIG. 3 shows an optical microscope photograph of a state of the surface where the PA6 resin powder was electrostatically attached to the carbon fiber substrate. The surface of the reinforcing fiber substrate is still mottled but is observed as if powdery snow is thinly spread.

FIG. 4 shows a scanning electron microscope (SEM) photograph of the surface of the prepared fiber-reinforced resin intermediate material. The surface of the fiber-reinforced resin intermediate material is observed such that there are a part where the carbon fiber bundle is covered with a syrup-like relatively thick coating, a part covered with a thin coating, and a part where the carbon fiber bundle itself is exposed. In the relatively thick coating part, narrow and long groove-like parts having different lengths are dotted along the direction of the carbon fiber, as if not completely filled up. That is, the reinforcing fiber substrate is observed to have void space opened on the outer surface in a semi-impregnated state with the PA6 resin.

Sixteen sheets of the above fiber-reinforced resin intermediate material were laminated in a mold and, after temperature was elevated to 260° C., the temperature was maintained, followed by pressurization at 5 MPa. Pressurization time was 70 seconds. FIG. 5 shows an optical microscope photograph of a cross-section of the molded fiber-reinforced resin molded article at a magnification of 400 times. The fiber-reinforced resin molded article had a void ratio of 0.5% or less. Moreover, the shaping ability of the fiber-reinforced resin molded article 30 was satisfactory and the edge part 31 of the groove shown in FIG. 2 could be also molded satisfactorily without deviation of fibers.

While the invention has been described in detail and with reference to specific embodiments thereof, it will be apparent to one skilled in the art that various changes and modifications can be made therein without departing from the spirit and scope thereof. The present application is based on Japanese Patent Application No. 2014-213114 filed on Oct. 17, 2014, and the contents are incorporated herein by reference.

REFERENCE SIGNS LIST

10: reinforcing fiber substrate
11: reinforcing fiber
20: resin powder
30: fiber-reinforced resin molded article
31: edge part of groove

The invention claimed is:

1. A fiber-reinforced resin intermediate material formed by attaching a resin to an outer surface part of a reinforcing fiber substrate, the reinforcing fiber substrate formed of reinforcing fibers, and heating the resin to a temperature equal to or higher than the melting point of the resin to impregnate the reinforcing fiber substrate with the resin,
    wherein the reinforcing fiber substrate has void space that is opened on an upper surface and a lower surface thereof and the resin is in a semi-impregnated state, and
    wherein the resin in the semi-impregnated state comprises a state in which a portion of the outer surface of the reinforcing fiber substrate is impregnated with a melted resin and another portion of the outer surface of the reinforcing fiber substrate is not impregnated with the melted resin.

2. The fiber-reinforced resin intermediate material according to claim 1, wherein the resin to be attached to the reinforcing fiber substrate is a powder.

3. The fiber-reinforced resin intermediate material according to claim 2, wherein an average grain size of the resin powder is ½ to 30 times an outer diameter of a reinforcing fiber.

4. The fiber-reinforced resin intermediate material according to claim 1, wherein the reinforcing fiber is carbon fiber and basis weight of the reinforcing fiber substrate is 40 to 250 g/m2.

5. The fiber-reinforced resin intermediate material according to claim 4, wherein apparent density ρ is ½ to 1/50 of target apparent density ρc,
    the target apparent density ρc being ρc=Vr×ρr+Vf×ρf when fiber volume content of the carbon fiber is Vf and density thereof is ρf and resin volume content of the resin is Vr and density thereof is ρr.

6. A fiber-reinforced resin molded body, which is molded by laminating the fiber-reinforced resin intermediate material according to claim 1 and performing heating and pressurization.

7. A method for manufacturing a fiber-reinforced resin intermediate material, the method comprising:
    electrostatically attaching a resin powder having a predetermined average grain size to an outer surface part of a reinforcing fiber substrate so that fiber volume content of the fiber-reinforced resin intermediate material becomes a predetermined value based on the outer diameter of a reinforcing fiber of a plurality of reinforcing fibers that form the reinforcing fiber substrate and the bulk density of the reinforcing fiber substrate, wherein the reinforcing substrate is impregnated with a resin in a semi-impregnated state and has void space opened on an upper surface and lower surface thereof, and wherein the resin in the semi-impregnated state comprises a state in which a portion of the outer surface of the reinforcing fiber substrate is impregnated with a melted resin and another portion of the outer surface of the reinforcing fiber substrate is not impregnated with the melted resin.

* * * * *